Dec. 7, 1948.   S. R. JOHNSON ET AL   2,455,774
WATER JACKETED AND VENTILATED HORSE
Filed Jan. 10, 1946   4 Sheets-Sheet 1

Inventors
Scott R. Johnson,
Ralph M. Mero.
By Mason, Porter & Diller
Attorneys

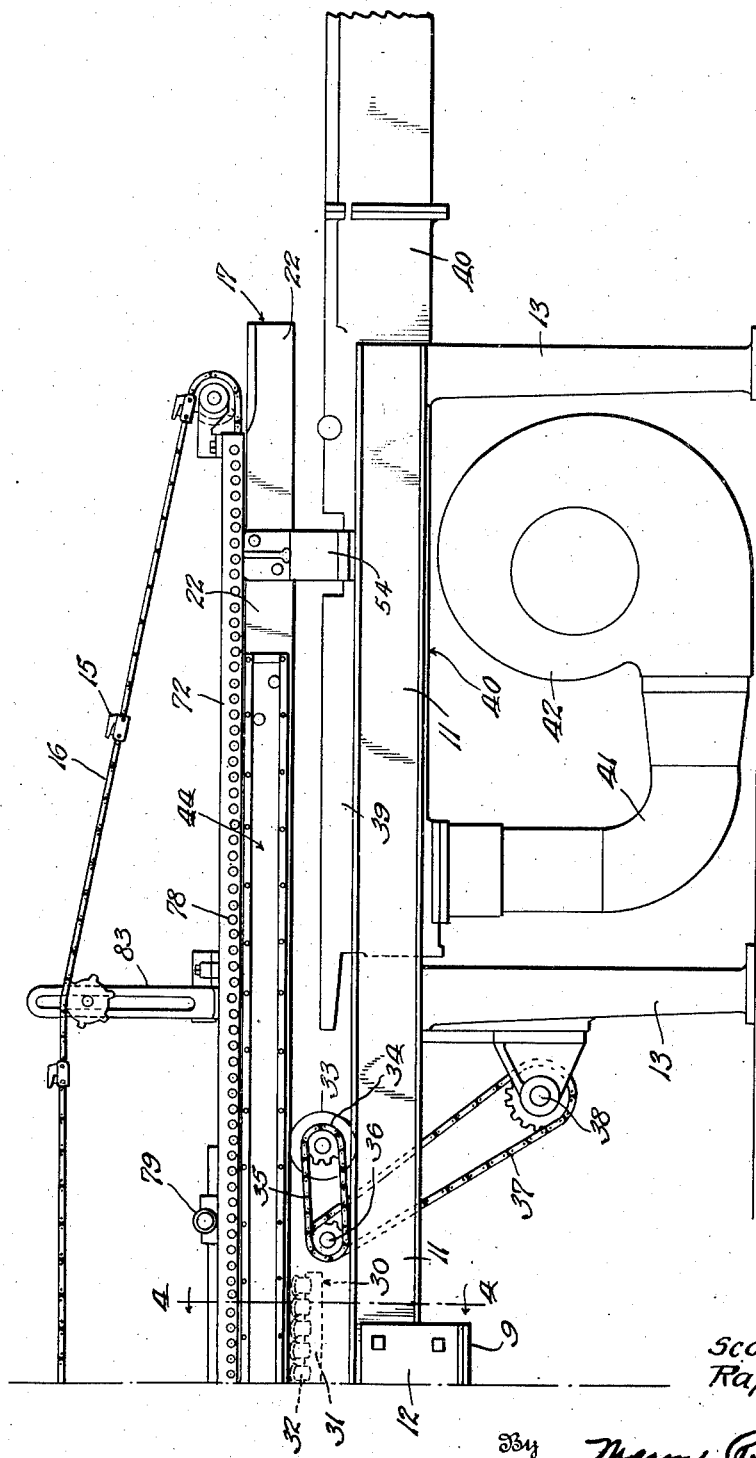

Dec. 7, 1948.  S. R. JOHNSON ET AL  2,455,774
WATER JACKETED AND VENTILATED HORSE
Filed Jan. 10, 1946  4 Sheets-Sheet 3
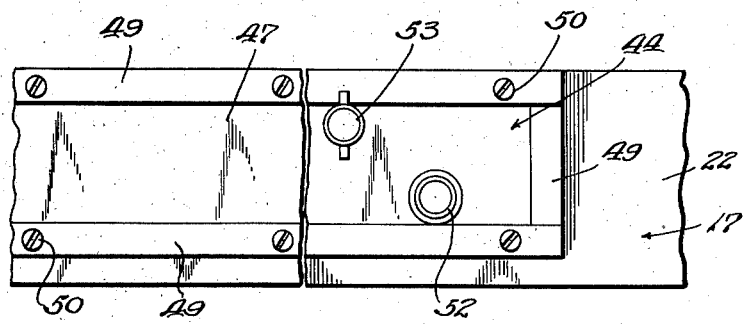
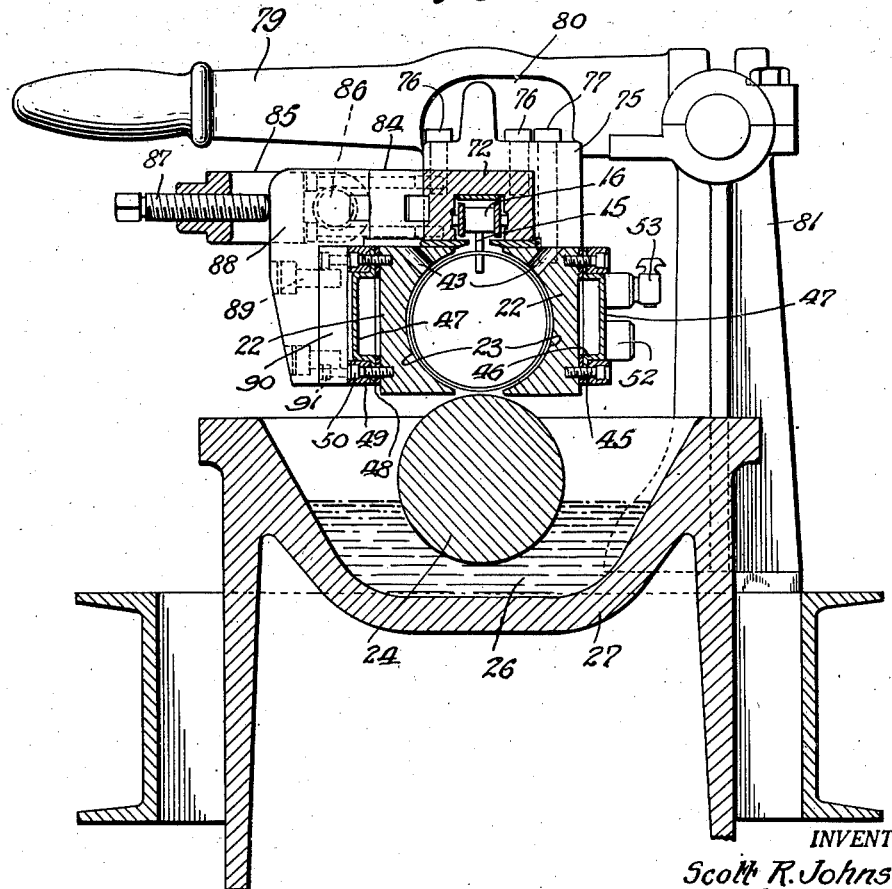
INVENTORS
Scott R. Johnson,
BY Ralph M. Mero
Mason, Porter & Diller
ATTORNEYS.

Dec. 7, 1948. S. R. JOHNSON ET AL 2,455,774
WATER JACKETED AND VENTILATED HORSE
Filed Jan. 10, 1946 4 Sheets-Sheet 4

Inventors
Scott R. Johnson,
Ralph M. Mero.

Patented Dec. 7, 1948

2,455,774

UNITED STATES PATENT OFFICE 2,455,774

WATER JACKETED AND VENTILATED HORSE

Scott R. Johnson and Ralph M. Mero, Chicago, Ill., assignors to Continental Can Company, Inc., New York, N. Y., a corporation of New York Application January 10, 1946, Serial No. 640,170

2 Claims. (Cl. 113—60)

The invention relates generally to the art of manufacturing cans and primarily seeks to provide, in a body maker, novel water jacketed and ventilated horse structure through which the can bodies pass while the side seams thereof are being solder bonded and while they are moving away from the solder bonding station and which is effective to dissipate heat in a manner permitting practical bonding of the can body side seams with silver-bearing solder to which a greater than normal amount of heat must be applied.

In the manufacture of can bodies in known body makers, the blanks are fed intermittently and in processional order along feedways to the forming station, marginal edge portions of the blanks being conditioned at suitable work stations for being formed into side seams as the bodies are shaped about the forming horn at the forming station. After being formed at the forming station the can bodies are moved along in an outside horn or horse composed of a pair of longitudinally extending laterally spaced rails having opposed concave faces cooperating to provide a supporting guideway for the can bodies. A chain guide rail is disposed centrally over and upon the horse, and the cans are moved continuously through the horse by feed dogs depending into the space between the horse rails from said chain. Just after leaving the forming horn the aligned can body side seams pass over and are contacted by a soldering roll, and the side seams are solder bonded by the solder applied by said roll, and thereafter the side seams pass over a rotating wiper roll which wipes off solder surplus adhering externally to the seams.

Conditions of supply and economics have at times made it necessary to use silver-bearing solder low in tin content as a substitute for the conventionally used tin-lead solder. When this substitution is made it is necessary to provide a higher solder bath temperature, pre-wiper burners are provided between the solder bonding station and the wiper roll for the purpose of keeping the excess solder adhering to the side seams hot enough to be properly removed by the wiper roll, and it may also be found desirable to provide preheater burners in advance of the solder bonding station in order to facilitate the solder bonding. This additional heat application has presented new problems in body maker operation because of the great amount of heat collecting inside and outside the horse and in the cans and the resultant softening and damaging of lacquer and decorative coatings on the can bodies and warping and sagging of the horse rails. It is the purpose of the present invention to provide novel means for dissipating the excessive heat in a manner effective to prevent damaging of the can coatings and also the warping and sagging of the horse rails.

In its more detailed nature the invention resides in providing a novel water jacket extending along each horse rail and through which a coolant can be continuously directed for dissipating heat from the horse rails, and novel air venting holes extending through portions of the horse rails and the chain guide rail in a manner for ventilating the rails and aiding in the dissipation of heat therefrom.

With the above and other objects in view that will hereinafter appear, the nature of the invention will be more clearly understood by reference to the following detailed description, the appended claims, and the several views illustrated in the accompanying drawings.

In the drawings:

Figures 1 and 1a together comprise a side elevation showing a portion of a body maker with the invention incorporated therein.

Figure 2 is an enlarged fragmentary side elevation of the water jacketing mounted on the horse.

Figure 3 is a vertical cross section taken on the line 3—3 on Figure 1.

Figure 1:
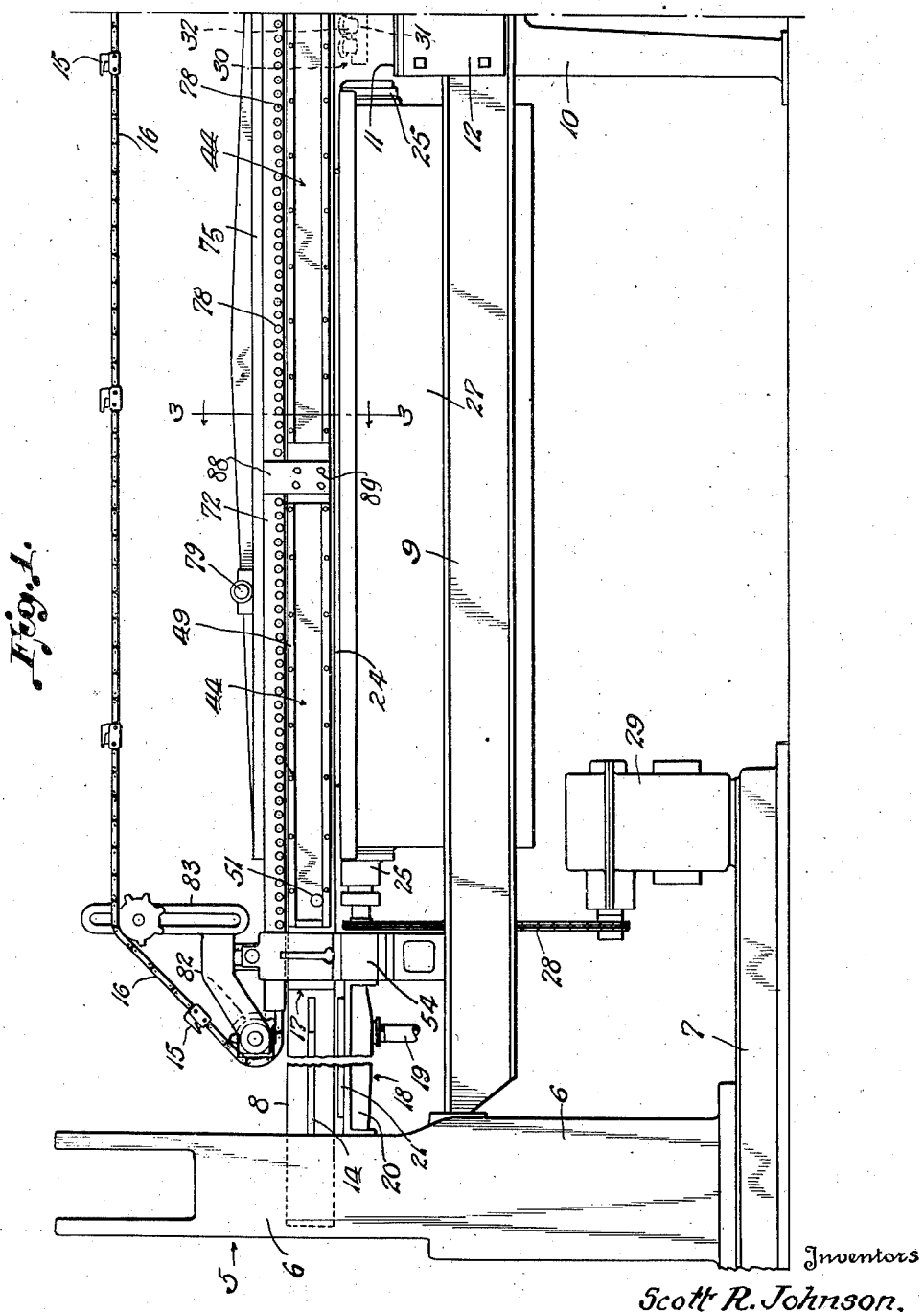

In the example of embodiment of the invention herein disclosed, the features of the invention are shown as incorporated in a body maker of the Troyer-Fox type well known in the art, but it is to be understood that said features may be incorporated in body makers of other types.

In the drawings, the forming station of the body maker is generally indicated at 5, the arch 6 at the forming station being supported upon a base 7. The well known expansible forming horn is mounted under the arch at the forming station, and the stub horn 8 extends in co-axial alignment therefrom.

Laterally spaced channel beams 9 extend longitudinally in parallel spaced relation from the arch 6 and are supported at their extended ends on frame standards 10. Channel beams 11 extend longitudinally beyond the ends of the channel beams 9 at a higher level, and the beams 9 and 11 have their upper and lower flanges cut away and the web or body portions thereof secured to the plate 12. The beams 11 are supported on frame standards 13.

The can bodies formed at the forming station are fed along the horn 8 by the usual reciprocating feeder means generally designated 14 into position for being picked up by the feeder lugs 15 projecting from the conveyor chain 16, and said chain feeds the can bodies into and through the outside horse or horn generally designated 17.

While passing to the horse 17, the can bodies pass over a preheating means generally designated 18. This preheating means may be of any approved construction and may include a gas supply 19, a manifold 20, and a longitudinal gas burner 21 disposed in position for directing a preheating flame against the side seams of the can bodies as they pass over the preheating means. The preheating of the side seams of the can bodies will facilitate the subsequent solder bonding of the side seams.

The outside horse generally designated 17 is composed of two longitudinally extending, laterally spaced rails 22 having concave opposing surfaces 23 which cooperate in providing a generally cylindriform guideway through which the can bodies are fed by the conveyor chain 16 in the manner previously stated.

Beyond the preheater 18, the horse passes over a solder roll 24. The solder roll is rotatably mounted as at 25 with the lower portion thereof immersed in a bath of molten solder 26 contained in the solder pot 27 which is supported between the rails 9 in the manner clearly illustrated in Figures 1 and 3 of the drawings. The roll 24 is driven by chain and sprocket transmission means 28 from a power source 29 mounted on the base 7.

Just beyond the solder pot 27 is mounted a sweater burner unit generally designated 30 and comprising two gas manifolds 31 which are longitudinally extended and arranged in laterally spaced parallel relation. The manifolds 31 are equipped with a plurality of angularly disposed staggered burners 32 so arranged as to direct flames against the side seams of the passing container bodies through the space between the horse rails 22 in the manner clearly illustrated in Figure 4 of the drawings.

Just beyond the sweater burner unit is mounted the usual wiper roll 33 which is rotatably supported as at 34 and driven by sprocket and chain connections 35 from a shaft 36 which is in turn driven by a sprocket and chain couple 37 from the driver shaft 38. It is to be understood that the shaft 38 is driven in the usual manner from a part of the body maker drive by means not shown. Beyond the wiper roll 33 the can bodies pass over a cooling blast duct 39 which extends longitudinally beneath the can body side seams and extends upwardly from a manifold 40 to which air is supplied through a duct 41 from a suitably driven blower 42.

In the foregoing, it will be apparent that as the can bodies are fed along the stub horn 8, the side seams thereof will be preheated by passage over the preheating burner 18, and promptly after this preheating, the can body side seams will have solder applied thereto by the rotating solder roll 24. The wiper roll serves to wipe off surplus solder applied to the exterior of the can bodies at the side seams, and the sweater burner disposed between the soldering roll and the wiper roll 33 serves the two-fold purpose of sweating in the solder and in maintaining the surplus solder at the exterior of the side seams in molten state so that it can be efficiently wiped off by the wiper roll 33.

It is to be understood that the solder bath is maintained in molten state by suitable heating means (not shown), and when silver-bearing solder is used in the bath, it is necessary to apply a greater amount of heat than when the conventionally used tin-lead solder is employed. It is also very desirable to include the preheater 18 and the sweater burner 30 when silver-bearing solder is employed. This increased application of heat serves to excessively heat the outside horse 17 and the can bodies passing therethrough, and without some provision for dissipating this heat, difficulties would be experienced in damaging the decorative and lining coatings on the can and in the warping and sagging of the rails 22 of which the horse is composed. It is the purpose of the present invention to provide such heat dissipating means, and this heat dissipating means, effective in combination with the previously described parts in rendering practical the use of silver-bearing solder by eliminating the problems of coating damage and the tendency of the horse rails to warp and sag will now be described.

Each horse rail 22 is provided with a row of upwardly and outwardly directed holes or vents 43, and along the outer face of each rail is secured a water jacket generally designated 44. It is to be understood that the water jacketing may be applied in single or multiple lengths.

Each water jacket unit includes marginal securing flanges 45, walls 46 bent outwardly at right angles from said flanges, and a main body wall 47 spaced from and disposed in parallel relation to the outer face of the horse rail so as to provide a coolant receiving chamber. Gaskets 48 are disposed between the flanges 45 and the opposing face of the respective rail 22, and the water jackets are secured in position by bars 49 which are screwed to the horse rails as at 50. Each water jacket unit also includes an inlet connection 51 and an outlet connection 52 through which water or some other coolant can be continuously directed through said unit to dissipate heat in combination with the heat dissipating vents 43. Each jacket unit also includes a vent disposed adjacent the top thereof and equipped with a valve 53 which may be opened or closed at will.

Support brackets 54 are secured as at 55 between the beams 9 or 11, and said brackets have fixed uprights 56 along one side thereof. Cross bars 57 are secured as at 58 to the longitudinally extending jacket securing bars 49 and to the horse rails 22 and are in turn secured as at 59 to the bracket uprights 56, thereby to support the horse rail 22 at the particular side of the body maker. The brackets 54 also include support bracket portions 60 extending under said horse rail.

At the other side of the body maker the brackets 54 are equipped with slideways 61 whereon are movably mounted brackets including uprights 62. Cross bars 63 are secured as at 64 to the longitudinally extending jacket securing bars 49 and to the other horse rail 22 and are in turn secured as at 65 to the uprights 62 for supporting said other horse rail. The brackets 62 have bearing surfaces 66 to be engaged by securing screws 67 carried by stirrups 68 which are swingably mounted as at 69 on the brackets 54. It will be apparent by reference to Figure 4 of the drawings that the screws serve to force the brackets 62 inwardly to definitely place the horse rail supported thereby by reason of the contact of the abutments 70 of the brackets 62 against the abutments 71 of the brackets 54.

Figure 4:
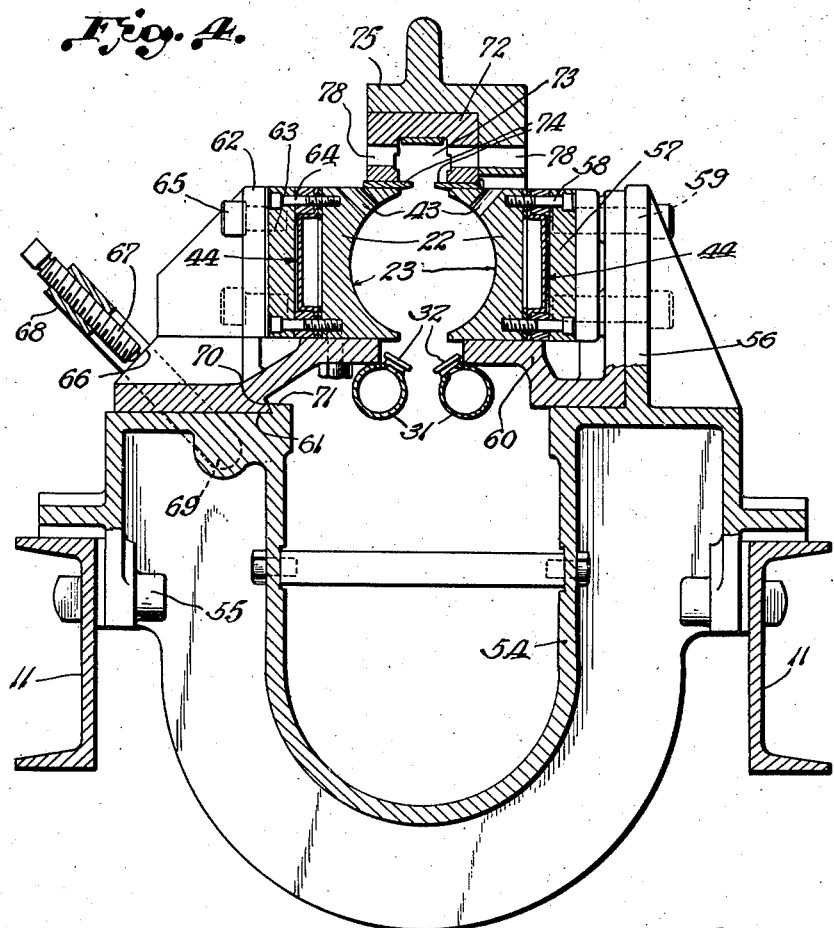
Figure 4 is a vertical cross section taken on the line 4—4 on Figure 1.
Figure 5:
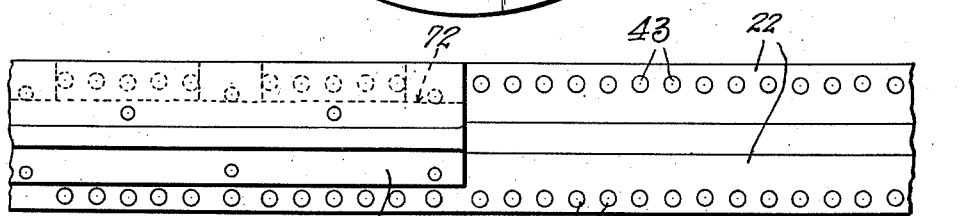
Figure 5 is a fragmentary plan view illustrating a portion of the water jacketed and ventilated horse and the overlying chain guide rail.

A chain guide rail 72 overlies the horse 17 in centered relation over the rails 22 in the manner clearly illustrated in Figures 3, 4 and 5, and said rail 72 is provided with a chain guideway 73 and supporting flanges 74 whereon the conveyor chain 16 can run. A rigid support member 75 is secured as at 76 to the rail 72 and at 77 to the fixed horse rail 22. It will also be apparent by reference to Figures 1, 1a and 4 of the drawings that the chain guide rail 72 and also the support member 75 are provided with registering vents or heat dissipating holes 78.

At one or more places in its length, the support member 75 and the chain guide rail 72 may have handle means 78 attached thereto as at 80 and pivoted to bracket means 81 so that when the screws 77 are removed, the guide rail 72 and said support member 75 may be swung upwardly out of effective position over the outside horse.

It will be apparent by reference to Figure 1 that the conveyor chain 16 passes over a sprocket 82 at the receiving end of the guide rail 72 and the top flight of the chain may be supported on sprockets mounted on bracket extensions 83.

Intermediate its length and opposite the solder roll, the chain guide rail 72 has spacer bar means 84 secured thereto, and said spacer bar means serves as a support for a stirrup 85 which is pivotally supported as at 86 on said bar means. The stirrup 85 is equipped with a screw 87 which is engageable with a block 88 secured as at 89 to the bar 90 which is in turn secured as at 91 across the jacket securing bars 49 in the manner clearly illustrated in Figure 3. By this means, the portion of the movable horse rail 22 at the position of the solder roll 24 is held against outward bending.

It will be obvious that by displacing the stirrup 85 and the stirrups 68, the brackets 62 may be slid outwardly on the slideways 61 and the supported horse rail 22 may be moved outwardly away from the companion horse rail.

It will be obvious that the water or other coolant flowing through the water jackets 44 in combination with the vents 43 and 78 will serve to dissipate heat from the horse 17 and prevent warping or sagging of the horse rails 22 and also the damaging of the coatings on the can bodies which pass through said horse.

While one form of the invention has been shown for purposes of illustration, it is to be clearly understood that various changes in the details of construction and arrangement of parts may be made without departing from the spirit and scope of the invention as defined in the appended claims.

We claim:

1. In a body maker wherein can bodies having side seams are formed, the combination of an outside horse composed of two laterally spaced parallel rails having concave opposing faces cooperating in forming a feedway for the formed can bodies, a conveyor chain for feeding the can bodies along the horse, a guide rail for the chain having a guideway through which said chain travels, means for solder bonding the can body side seams as the can bodies are moved along the horse, and jacketing extending along the laterally-outwardly presented face of each rail and providing chambering through which a coolant can flow for dissipating heat from the horse and preventing heat damaging of coatings on the can bodies and warping or sagging of the horse rails, said guide rail having ventilating air vents extending from its guideway through external wall portions thereof, and said horse rail also having a multiplicity of ventilating air vents extending from the concave faces thereof through external wall portions thereof along each side of the chain guide rail.

2. In a body maker wherein can bodies having side seams are formed, the combination of an outside horse composed of two laterally spaced parallel rails having concave opposing faces cooperating in forming a feedway for the formed can bodies, a conveyor chain for feeding the can bodies along the horse, a guide rail for the chain having a guideway through which said chain travels, means for solder bonding the can body side seams as the can bodies are moved along the horse, a rotary seam wiping roll disposed beyond the solder bonding means and beneath the horse, can body seam heating means disposed beneath the horse and in advance of and also beyond the solder bonding means and in advance of said wiping roll, and jacketing extending along the laterally-outwardly presented face of each rail and providing chambering through which a coolant can flow for dissipating heat from the horse and preventing heat damaging of coatings on the can bodies and warping or sagging of the horse rails, said guide rail having ventilating air vents extending from its guideway through external wall portions thereof, and said horse rail also having a multiplicity of ventilating air vents extending from the concave faces thereof through external wall portions thereof along each side of the chain guide rail.

SCOTT R. JOHNSON.
RALPH M. MERO.

REFERENCES CITED

The following references are of record in the file of this patent:

UNITED STATES PATENTS

| Number | Name | Date |
| --- | --- | --- |
| 137,888 | Brooks | Apr. 15, 1873 |
| 1,338,716 | Widell | May 4, 1920 |
| 1,534,677 | Assman | Apr. 21, 1925 |
| 1,604,181 | Lincoln | Oct. 26, 1926 |
| 1,639,955 | Murch | Aug. 23, 1927 |
| 1,918,197 | Sebell | July 11, 1933 |
| 1,939,723 | Peters | Dec. 19, 1933 |
| 1,947,471 | Holloway | Feb. 20, 1934 |
| 2,166,598 | Kronquest | July 18, 1939 |
| 2,280,150 | Hasse | Apr. 21, 1942 |
| 2,305,387 | Pearson | Dec. 15, 1942 |
| 2,338,054 | O'Neil | Dec. 28, 1943 |